United States Patent
Brown et al.

(10) Patent No.: US 6,835,229 B2
(45) Date of Patent: Dec. 28, 2004

(54) METHOD AND APPARATUS FOR CLEARING A POWDER ACCUMULATION IN A POWDER DELIVERY TUBE

(75) Inventors: Robert K. Brown, Abingdon, MD (US); Mark J. Zolenas, Upper Falls, MD (US)

(73) Assignee: ISG Technologies Inc., Richfield, OH (US)

( * ) Notice: Subject to any disclaimer, the term of this patent is extended or adjusted under 35 U.S.C. 154(b) by 226 days.

(21) Appl. No.: 10/051,165

(22) Filed: Jan. 22, 2002

(65) Prior Publication Data

US 2003/0136318 A1 Jul. 24, 2003

(51) Int. Cl.[7] ............................................... C21B 5/00
(52) U.S. Cl. ..................... 75/460; 266/135; 266/269
(58) Field of Search .................... 75/460; 266/135, 266/268, 134, 265, 264

(56) References Cited

U.S. PATENT DOCUMENTS

| | | |
|---|---|---|
| 504,482 A | 8/1893 | Dauber |
| 1,542,245 A | 6/1925 | Henrich |
| 1,693,916 A | 12/1928 | De Bethune |
| 2,867,119 A | 1/1959 | Stugeon et al. |
| 3,165,399 A | 1/1965 | Kennedy |
| 3,204,942 A | 9/1965 | Matthys et al. |
| 3,346,250 A | 10/1967 | Strassburger |
| 3,368,804 A | 2/1968 | Swain |
| 3,397,877 A | 8/1968 | Strassburger |
| 3,971,654 A | 7/1976 | Mancke ........................... 75/42 |
| 4,205,929 A | 6/1980 | Schiffman et al. ........... 406/197 |
| 4,519,587 A | 5/1985 | Peckels et al. ................. 266/80 |
| 4,522,376 A | 6/1985 | Langenfeld .................... 266/47 |
| 4,527,776 A | 7/1985 | Scheel ........................... 266/44 |
| 4,533,289 A * | 8/1985 | Guzdar ........................ 414/217 |
| 4,624,684 A | 11/1986 | Stevenson ..................... 48/197 |
| 4,813,179 A | 3/1989 | Ribesse ........................ 48/210 |
| 4,900,357 A | 2/1990 | Bates .......................... 75/51.1 |
| 4,989,839 A | 2/1991 | Simms et al. ................. 266/80 |
| 5,123,632 A | 6/1992 | Schmit et al. ................ 266/47 |
| 5,265,983 A | 11/1993 | Wennerstrom et al. ....... 406/24 |
| 5,332,419 A | 7/1994 | Lemay et al. ................ 75/533 |
| 5,397,108 A | 3/1995 | Alexander et al. .......... 266/100 |
| 5,481,247 A | 1/1996 | Alexander et al. .......... 340/518 |
| 5,657,704 A | 8/1997 | Schueler ..................... 110/106 |
| 6,187,258 B1 | 2/2001 | Hamberger et al. ......... 266/47 |
| 2003/0136318 A1 * | 7/2003 | Brown et al. ............... 110/341 |

FOREIGN PATENT DOCUMENTS

| | | | |
|---|---|---|---|
| EP | 0922772 | 6/1999 | |
| JP | 35902049 A | * 2/1984 | .................. 75/460 |
| WO | WO 97/27430 | 7/1997 | |

* cited by examiner

*Primary Examiner*—Scott Kastler
(74) *Attorney, Agent, or Firm*—Liniak, Berenato & White, LLC

(57) ABSTRACT

A system for monitoring coal flow through a coal delivery tube in a blast furnace fuel injection system is disclosed, which system automatically actuates a purge cycle for clearing accumulations of coal from a coal lance when a temperature drop indicative of an imminent blockage is detected. A method of controlling the purge system is also disclosed.

32 Claims, 3 Drawing Sheets

METHOD AND APPARATUS FOR CLEARING A POWDER ACCUMULATION IN A POWDER DELIVERY TUBE

FIELD OF THE INVENTION

The present invention is directed toward a method and apparatus for clearing a powder accumulation in a powder delivery tube, and more specifically, toward a method and apparatus for removing a build-up of coal on the interior wall of a coal lance that delivers powdered coal to a blast furnace blowpipe.

BACKGROUND OF THE INVENTION

A typical blast furnace comprises an elongated section known as a stack, a hearth, and a section known as a bosh located between the hearth and the stack. A high temperature blast gas, usually compressed air, is pumped through blowpipes and though openings in the walls of the hearth called tuyeres into the upper portion of the hearth. Material known as the burden, which generally includes limestone, iron-bearing material, and a carbonaceous material such as coke, is intermittently charged into the furnace at the top of the stack and allowed to move down the stack. In the zone adjacent the tuyeres, the coke or other carbonaceous material burns, and the heat of combustion smelts the ore to produce molten pig iron. The products of combustion, being at relatively high temperature, serve to preheat the burden as they pass upwardly through the stack.

In a process known as "fuel injection," a supplemental fuel such as coal is introduced into the furnace with the blast gas. This is typically done by inserting a coal lance through the wall of a blowpipe near a tuyere and blowing powdered coal from a source of coal through the coal lance. Fuel injection reduces the amount of coke needed to operate a blast furnace. Because coal is less expensive than coke, this process also increases the efficiency of iron production. Fuel injection and its benefits are discussed in more detail in U.S. Pat. No. 3,368,804, which patent is hereby incorporated by reference.

While fuel injection results in more efficient blast furnace operation, passing powdered coal through tubes that normally carry only a compressed gas can lead to problems. For example, it has been found that, over time, powdered coal tends to accumulate on the inner walls of the blowpipes and coal lances. If this coal is not removed promptly, the high temperatures may convert it to coke, a hard material that is very difficult to remove without damaging the wall to which it is attached. If a coal lance becomes blocked, no supplemental fuel will be injected into the furnace through a particular tuyere. If a blowpipe becomes blocked, no blast gas or coal will enter the furnace through the tuyere connected to that blowpipe. These blockages not only can damage the coal lances and blowpipes, but also affect combustion conditions near a particular tuyere and thus can also affect the smelting operation.

To clear such accumulations, many blast furnaces are provided with a purging system that pumps a fluid such as nitrogen through the coal lance and/or blowpipe periodically to dislodge accumulations of coal. However, with such systems, a balance must be struck between cycling the system too often, which wastes resources and can adversely affect furnace operation, and cycling the system too infrequently and thereby allowing accumulations to form. It is generally necessary to err toward purging too often to reduce the likelihood that blockages will occur.

Various systems are known from the prior art for monitoring conditions in a fuel injection system and for detecting and clearing accumulations of coal. For example, U.S. Pat. No. 3,368,804 shows a fuel injection control for a blast furnace that uses a magnetic flow transmitter to measure the flow of powdered coal through a coal delivery pipe. A purge valve 27 is opened to purge the fuel line and tuyere with water when the flow rate decreases, indicating an actual or imminent blockage. U.S. Pat. No. 4,519,587, incorporated herein by reference, shows another system for clearing a blockage when a pressure sensor in the coal delivery pipe indicates that the flow of coal is slowing due to an accumulation of coal downstream from the sensor. U.S. Pat. No. 5,397,108 shows a system for monitoring conditions in a blowpipe using an optical sensor. When the tuyere or blowpipe becomes blocked, less light from the fire in the furnace reaches the sensor and an alarm is sounded.

Prior art systems such as the above rely on sensors partially or entirely mounted in the fuel delivery system itself. These sensors are exposed to a hostile environment and must either be designed to withstand the conditions present or be adequately shielded therefrom. Thus the sensors tend to be expensive, and, as the coal delivery system or blowpipe must be modified to allow the use of such sensors, they are also expensive to install and maintain. Moreover, a typical blast furnace may have on the order of thirty-eight tuyeres, blowpipes and coal lances, and thus need thirty-eight separate sensors. It would therefore be advantageous to provide a method of monitoring the flow rate of coal through a coal lance that uses a relatively inexpensive sensor that does not need to be inserted into the fuel delivery system in order to detect conditions therein indicative of an imminent blockage.

SUMMARY OF THE INVENTION

These problems and others are addressed by the present invention which comprises a system for detecting and automatically clearing a blockage or accumulation of material in a powder delivery tube using a fluid under pressure which system detects the blockage or accumulation by monitoring the temperature or another condition on the outside of the powder delivery tube. While the present system could be used in a variety of environments where powder is delivered through a tube that needs to be purged when a blockage begins to form, it finds particular use in the environment of a coal delivery system in a blast furnace wherein coal is delivered from a source to a blowpipe. The invention will be described hereinafter in the environment of a blast furnace, it being understood that it would function equally well in other environments.

Powdered coal is ground in a process that heats the coal, and as this powdered coal flows through the coal delivery system, heat is also generated by friction between the coal particles and between the coal particles and the wall of the tube carrying the coal. This heat can be measured from the outside of the coal lance or coal pipe. More heat is generated the faster the coal moves through the tube. In the preferred embodiment, a thermocouple is attached to the outside of the coal delivery pipes, upstream from each coal lance, to measure the temperature of the outside walls of the coal pipes. A drop in temperature in one of the coal pipes is taken to indicate that the flow of coal within that coal pipe has slowed and that a blockage is beginning to form. The supply of coal to that coal lance is then stopped and a purge cycle is started to blow nitrogen though the coal lance and into the blowpipe to clear out the lance. The flow of coal is restarted after the purge cycle is complete.

The purge system preferably includes two valves in the coal tube and a purge line connected to the coal tube between these valves. The purge line also has a valve for connecting a source of fluid under pressure, nitrogen gas, for example, to the coal tube. All three valves are remotely controllable by a programmable logic controller (PLC) and/or a computer. The valves in the coal tube are normally open and the valve in the purge line is normally closed. However, when a blockage is detected, the valve upstream (toward the coal source) from the purge line is closed to temporarily stop the flow of coal, and the valve in the purge line is opened for a set period of time, three minutes for example, to clear any accumulations of coal. Optionally, after this portion of the purge cycle is complete, the valve downstream from the purge line may be closed and the upstream valve opened so that the purge fluid will flow toward the coal source and clear any accumulations of coal in that direction as well. When the entire purge cycle is complete, the valve in the purge line is closed and the two valves in the coal tube are returned to their open state to allow the flow of coal to resume.

A blast furnace operates under various ambient conditions which can affect the temperature of the coal tubes. For example, the temperature of all coal tubes may vary throughout the day or year as the local temperature rises or falls. Likewise, the temperatures of the various coal pipes around the furnace may be affected by wind so that the coal pipes on one side of the furnace are hotter than those on the other. To address these differences, a fixed "normal" temperature is not assumed, but rather a floating average of the temperatures of a group of coal pipes is measured, and deviations from this average are noted. While the temperature of all coal pipes in a system could be averaged, in the preferred embodiment, the coal pipes are divided into two groups and a floating average temperature for each of these two groups is monitored. What is important is that deviations from a normal operating temperature, generally about 130 degrees F., are detected regardless of the absolute value of that normal temperature. When the temperature of a given coal pipe drops more than 10 degrees F. from normal, a purge cycle is initiated.

For a period of about five minutes after a purge, the temperature of the coal pipe may be lower than normal; therefore, no purges are carried out during this five minute period, even if the detected temperature is outside the normal range. Starting about five minutes after a purge, the system is once again set to execute purges when further temperature drops are detected. Preferably, an alarm is sounded at each purge to notify an operator of a potential problem so that the operator can determine whether further action is warranted, such as manually cleaning or replacing a badly blocked coal lance.

It is therefore a primary object of the present invention to provide a system for detecting and removing powder accumulations in a powder delivery system.

It is another object of the present invention to provide a system for detecting powder accumulations in a powder delivery system using sensors mounted outside the tubes carrying the powder being delivered.

It is a further object of the present invention to provide a system for detecting a partial blockage of a powder delivery tube by measuring the temperature of a surface of a powder delivery tube.

It is still another object of the present invention to provide a system for purging a coal tube in a blast furnace fuel injection system to remove accumulations of coal before the coal completely blocks the coal tube.

It is still a further object of the present invention to provide an apparatus for clearing accumulations of coal from individual coal lances of a blast furnace fuel injection system which apparatus includes thermocouples mounted on the outside surfaces of coal pipes connected between a source of coal and a plurality of coal lances for determining the temperature of each coal pipe and a controller for operating a purging system in response to detected temperature drops to purge a given coal lance before it becomes completely blocked.

In furtherance of these objectives, a purging system for clearing an accumulation of powder from a powder delivery tube is provided which includes a sensor mounted outside the powder delivery tube between a powder source and a powder destination for producing signals representing a flow rate of powder within the powder delivery tube. A source of fluid under pressure is selectively connected to a first location on the powder delivery tube through a first valve and a controller operatively connected to the sensor controls the first valve in response to the signals from the sensor.

A method of clearing an accumulation of coal in a coal tube connecting a source of coal to a tuyere is also provided comprising the steps of monitoring a condition on an exterior portion of the coal tube indicative of a flow rate of material through the coal tube and determining when the flow rate has dropped to below a predetermined level. When the flow rate drops, the flow of coal though the coal tube is stopped and the tube is purged with a fluid under pressure; then the flow of coal is restarted.

Another aspect of the invention comprises a method of clearing an accumulation of coal in a coal tube comprising the steps of monitoring the temperature of a coal tube and stopping the flow of coal though the coal tube when the temperature falls below a predetermined level and purging the coal tube with a fluid under pressure before restarting the flow of coal through the coal tube.

Another aspect of the invention comprises a system including a blast furnace having at least one tuyere, a blowpipe for delivering a heated fluid to the tuyere, a source of coal, and a coal tube connected between the source of coal and the blowpipe. A source of pressurized fluid is connected to the coal tube at a first location and a first valve is connected between the source of pressurized fluid and the coal tube for controlling the flow of fluid from the source of pressurized fluid. A second valve is located in the coal tube between the first location and the source of coal and a third valve is located in the coal tube between the first location and the tuyere. A controller is provided for controlling the first, second and third valves in response to signals from a temperature measuring device operatively connected to the controller and the coal tube.

A further aspect of the invention comprises a purging system for clearing an accumulation of coal from a coal lance fed by a coal pipe which system comprises a temperature sensor connected to the coal pipe for producing signals representative of a sensed temperature, a source of fluid selectively connectable to the coal lance through a valve, and a controller operatively connected to the sensor for controlling the valve in response to the signals from the sensor. The controller opens the valve for a period of time when the temperature of the coal pipe falls below a given level.

Another aspect of the invention comprises a method of regulating the flow of coal in a system for delivering coal from a source of coal to a coal lance comprising the steps of first connecting the source of coal to the coal lance with a coal pipe then providing a source of fluid under pressure and connecting the source of fluid to the coal pipe at a first location. A first valve is placed between the source of fluid and the first location and a second valve is placed between the source of coal and the first location while a third valve is placed between the first location and the coal lance. The first valve is normally closed while the second is normally open. The temperature of the coal pipe is measured, and, if the temperature of the coal pipe falls below a given value, the second valve is closed and the first valve is opened for a first period of time.

BRIEF DESCRIPTION OF THE DRAWINGS

The subject invention will be more thoroughly understood after a reading of the following detailed description of a preferred embodiment in connection with the following drawings.

DETAILED DESCRIPTION OF THE INVENTION

Figure 1:
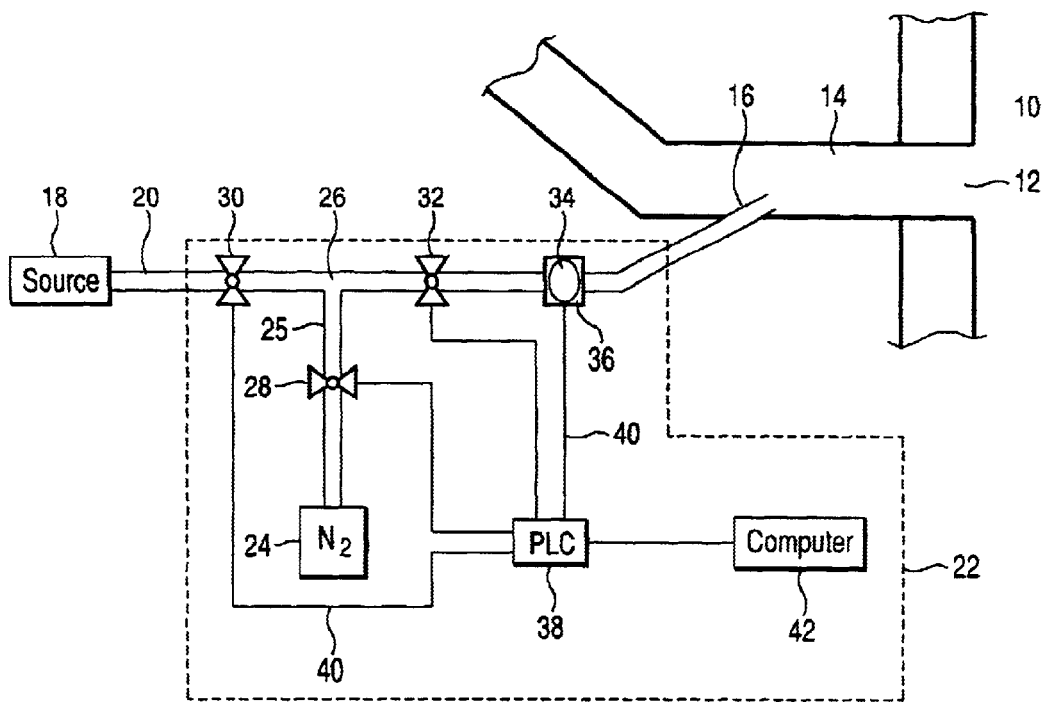
FIG. 1 is a schematic view of blast furnace fuel injection system including a coal lance purge system according to the present invention.

Referring now to the drawings, wherein the showings are for purposes of illustrating a preferred embodiment of the invention only, and not for the purpose of limiting same, FIG. 1 shows a blast furnace 10 including a plurality of tuyeres 12, each supplied with heated air by a blowpipe 14 connected to a stove (not shown). In the preferred embodiment, the blast furnace includes thirty-eight tuyeres and thirty-eight sets of blowpipes arranged in a generally symmetrical manner about the periphery of the furnace. However, for simplicity, only one of the tuyeres is shown in FIG. 1. A coal lance 16 extends into blowpipe 14 and is connected to a source of coal 18 by a coal pipe 20. The coal lance is the generally rigid member that penetrates the blowpipe and extends into the flow of hot gasses, while the coal pipe may comprise a rigid pipe, a flexible hose, or other conduit for carrying powdered coal from the source to the coal lance. For purposes of the following disclosure, the term "coal tube" is used to describe the coal pipe and the coal lance in combination, while "coal pipe" is used to describe any combination of pipes or conduits leading from the coal source to the coal lance.

A purge system is designated generally by the numeral 22 and includes a source of compressed gas or other fluid under pressure 24, a purge tube 25 connected between source 24 and coal pipe 20 at a location 26, a first valve 28 in the purge tube, a second valve 30 in the coal pipe upstream of location 26 and a third valve 32 in the coal pipe downstream of location 26, where the terms "upstream" and "downstream" are used relative to the normal direction of flow of powdered coal from source 20 to blowpipe 14. A temperature sensor 34, such as a thermocouple, and preferably a T-type thermocouple, is attached to the outer wall of coal pipe 20 and is enclosed within suitable insulating material 36 to shield it from the heat coming from the blowpipe and the blast furnace so that only the temperature of the coal pipe is measured. Beneficially, the temperature sensor is mounted far enough away from the hot blowpipe so as not to be overly affected by the heat given off by the blowpipe. The valves and the temperature sensor are all operatively connected to a programmable logic controller (PLC) 38 by leads 40, or by RF transmitters and receivers (not shown), for example, and PLC 38 is in turn operatively connected to a computer 42.

Figure 2:
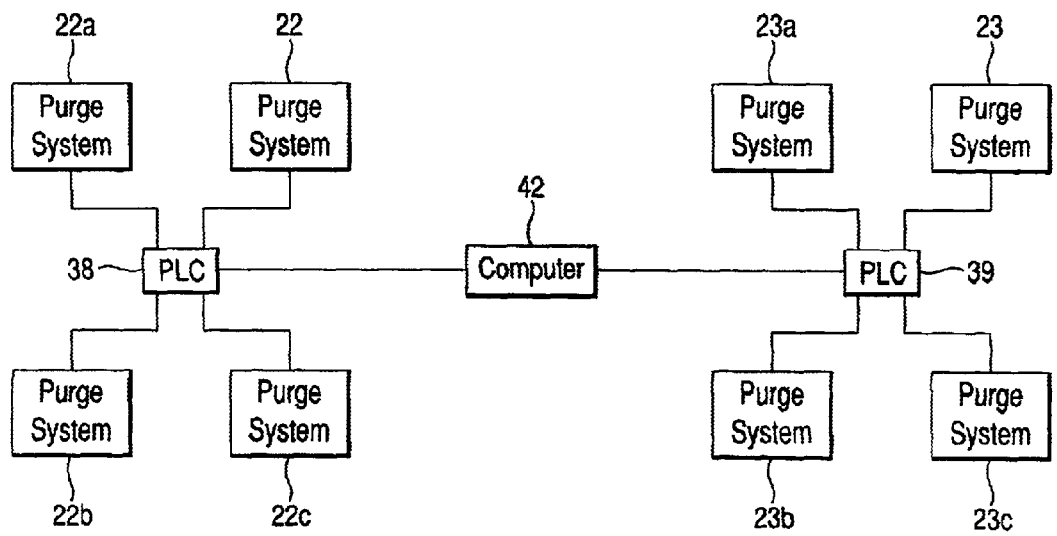
FIG. 2 is a schematic view of two groups of coal lance purge systems each connected to a programmable logic controller.

While each blowpipe includes a temperature sensor, three valves, and a purge pipe so that each coal lance can be individually purged, a single PLC may be used to control the valves associated with multiple blowpipes, and the purge pipes may be connected to a single source of fluid under pressure. In the preferred embodiment, two PLC's are used and each controls the purge system of a group of nineteen blowpipes. Likewise, a single computer can be used to control the pair of PLC's or even to control the PLC's associated with various blast furnace throughout a facility. FIG. 2 schematically shows four purge systems 22, 22a, 22b and 22c connected to a first PLC 38 and four purge systems 23, 23a, 23b and 23c connected to a second PLC 39. Both PLC's are connected to a computer 42. Only four purge systems are shown connected to each of the PLC's for simplicity—nineteen would be connected to each PLC in the preferred embodiment.

Under normal operating conditions, first valve 28 is closed while second valve 30 and third valve 32 are open so that powdered coal can flow from source 18 through coal pipe 20 and coal lance 16 into blowpipe 14. Friction between the flowing coal particles and between the coal and the inner wall of the coal tube increases the temperature of the coal tube which temperature is detected by sensor 34. In the preferred embodiment, coal is fed though the thirty-eight coal pipes, each having a 1 inch internal diameter, at a rate of between about 0.75 and 2.25 tons per hour per pipe. A common detected temperature under these conditions is approximately 130° F., although this temperature may vary significantly depending on the conditions surrounding the blast furnace. Other coal flow rates through tubes having different diameters may produce different temperatures.

Because the temperature surrounding the furnace can vary depending on ambient temperatures and other conditions, it is not practical to select a fixed temperature as the normal temperature and monitor for deviations from this temperature. Rather, the temperature detected by each of the nineteen sensors is monitored and averaged by the computer to obtain a floating average for the nineteen sensors. Then the usual deviation from this average is determined for each of the nineteen sensors, and the floating average plus or minus the usual deviation is taken as the baseline temperature for each sensor. Thus, if the floating average of nineteen sensors is 130° F., but a first sensor is generally three degrees hotter than average, the baseline temperature for that first sensor will be taken to be 133° F. If the floating average drops to 128° F., the baseline temperature for the first sensor will be 131° F.

It has been determined that the temperature of a coal pipe when coal is flowing at a desired rate is about 30 degrees higher than it would be if no coal were flowing. Thus a temperature drop of 30° is indicative of a complete blockage of the coal tube. However, temperature variations of three or four degrees in a coal tube are not uncommon, especially if an automatic system purge has just taken place. Therefore, it has been determined that the purge system should be automatically operated each time a temperature change of 10° is detected. This avoids unnecessary purges immediately after small temperature fluctuations such as occur immediately after an automatic purge has occurred, but also allows a purge to occur quickly enough to remove blockages before they become a substantial problem.

Figure 3:
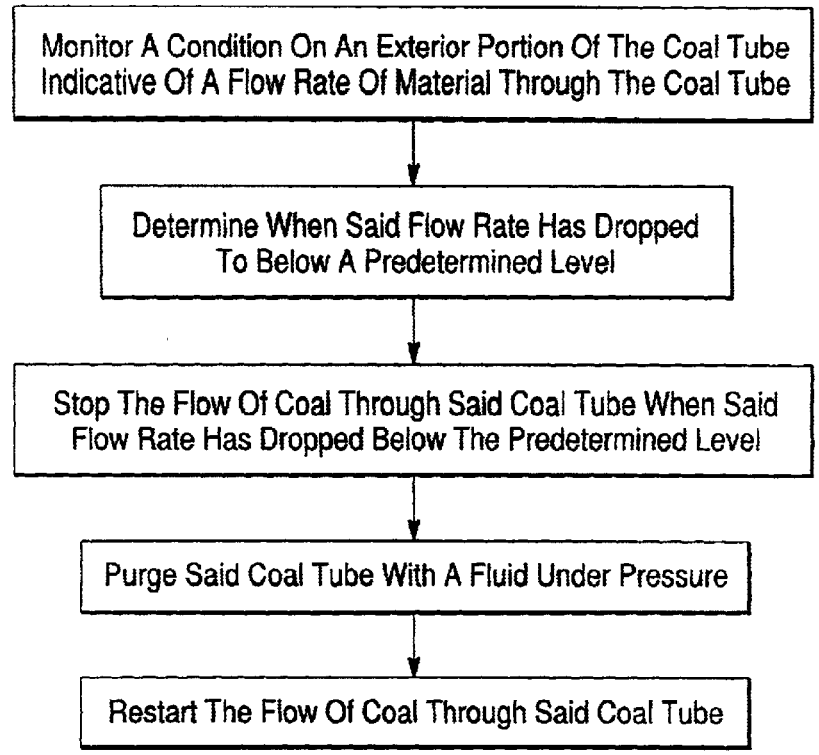
FIG. 3 is a flow chart showing a first set of steps for monitoring and purging a fuel injection system according to the present invention.
Figure 4:
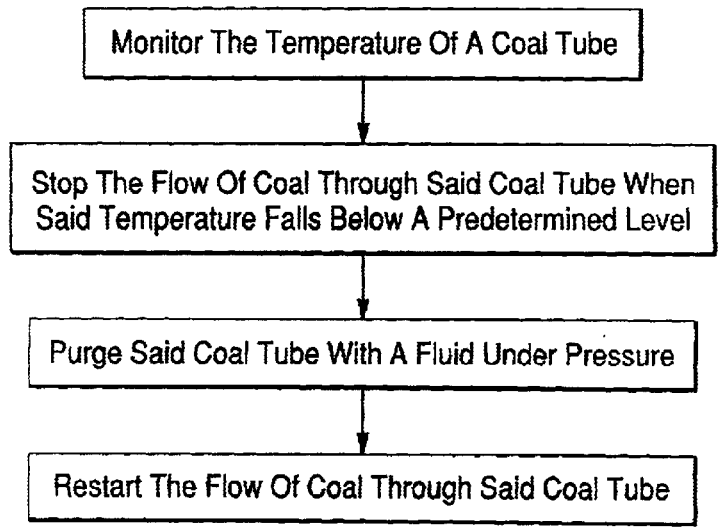
FIG. 4 is a flow chart showing a second set of steps for monitoring and purging a fuel injection system according to the present invention.
Figure 5:
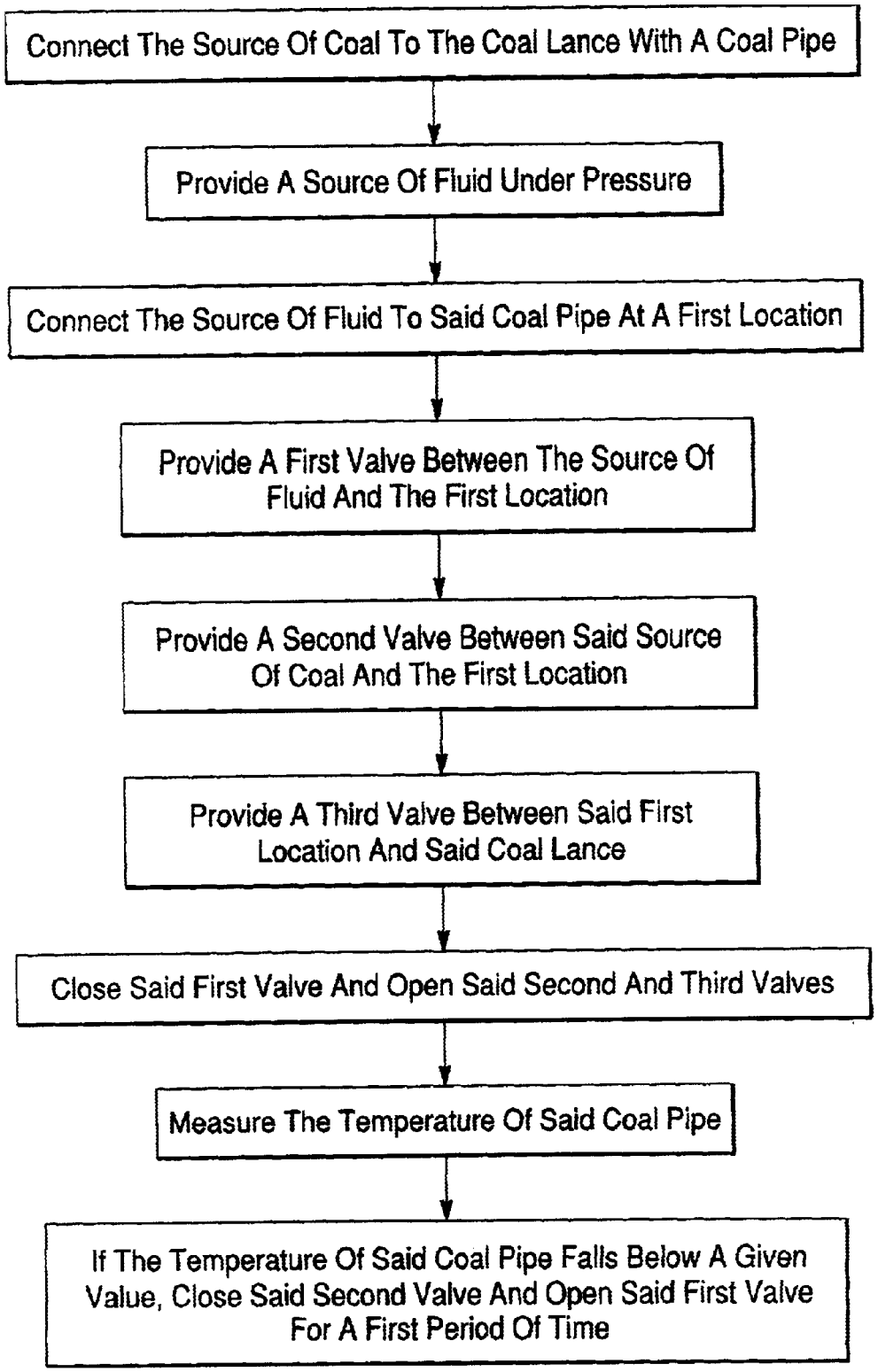
FIG. 5 is a flow chart showing a third set of steps for monitoring and purging a fuel injection system according to the present invention.

When the temperature of one of the tubes falls ten degrees below its baseline temperature, PLC 38 closes second valve 30 and opens first valve 28 to allow compressed nitrogen to flow from source 24 through purge pipe 25 past location 26 and into coal lance 16 and blowpipe 14. The gas is allowed to flow for approximately three minutes to dislodge the coal powder that has accumulated within the coal lance. Then, because the temperature drop could have been caused by a blockage between location 26 and the coal source 18, a second purge cycle may also optionally be carried out by closing third valve 32 and opening second valve 30 to drive coal powder from location 26 back toward coal source 18 and to dislodge any blockages in that portion of the coal delivery path. After the purge cycle is complete, first valve 28 is closed and second and third valves 30 and 32 are opened to allow the normal flow of coal to resume. FIGS. 3–5 outline the method steps for carrying out this method.

Computer 42 is programmed to run an automatic purge of each of the coal lances periodically, every two hours, for example. If a blockage is detected by a temperature drop at a time between these periodic purges, an additional purge is carried as described above. For a period of about five minutes after each purge, the temperature of the coal pipe may be lower than normal; therefore, no purges are carried out during this five minute period, even if the detected temperature is outside the normal range. Starting about five minutes after a purge, the system is once again set to execute purges when further temperature drops are detected. Preferably, an alarm is sounded at each purge to notify an operator of a potential problem so that the operator can determine whether further action is warranted. For example, if the coal at the end of a given coal lance is heated so that it begins to convert to coke on the inside walls of the lance, the hard coke may not be dislodged during the purging cycle and may act as a foundation on which additional coal powder quickly accumulates. In this case the coal lance may need to be mechanically cleaned or replaced entirely.

The subject invention has been described in terms of a preferred embodiment, it being understood that obvious additions and changes will become apparent to those skilled in the relevant art upon a reading and understanding of the invention. For example, while the temperature sensor has been shown mounted upstream from the coal lance, it could also be attached to the coal lance itself or to a location on the coal pipe further upstream from the coal lance. It is intended that all such obvious changes and additions be included in this invention to the extent that they fall within the scope of the several claims appended hereto.

We claim:

1. A purging system for clearing an accumulation of powder from a powder delivery tube comprising:
   a sensor mounted outside the powder delivery tube between a powder source and a powder destination for measuring conditions between said powder source and said powder destination and for producing signals representing a flow rate of powder within the powder delivery tube;
   a source of fluid under pressure selectively connectable to a first location on said powder delivery tube through a first valve; and
   a controller operatively connected to said sensor and said first valve for controlling said first valve in response to the signals from said sensor.

2. The system of claim 1 including a normally open second valve connected between said powder source and said first location and operatively connected to said controller.

3. The system of claim 2 including a normally open third valve connected between said powder destination and said first location and operatively connected to said controller.

4. The system of claim 1 wherein said sensor comprises a temperature sensor.

5. The system of claim 3 wherein said controller closes said second valve and opens said first valve for a first period of time when the signals from said sensor indicate said flow rate has dropped below a predetermined level.

6. The system of claim 3 wherein said controller closes said second valve and opens said first valve for a first period of time when the signals from said sensor indicate said flow rate has dropped below a predetermined level, then closes said third valve and opens said second valve for a second period of time, then closes said first valve and opens said third valve.

7. A method of clearing an accumulation of coal in a coal tube connecting a source of coal to a tuyere comprising the steps of:
   monitoring a condition on an exterior surface of the coal tube indicative of a flow rate of material through the coal tube;
   determining when said flow rate has dropped to below a predetermined level;
   stopping the flow of coal though said coal tube;
   purging said coal tube with a fluid under pressure; and
   restarting the flow of coal through said coal tube.

8. The method of claim 7 wherein the step of monitoring a condition on an exterior surface of a coal tube comprises the step of monitoring the temperature of said coal tube.

9. The method of claim 8 wherein the step of determining when said flow rate has dropped to below a predetermined level comprises the step of determining when the temperature of said coal tube has fallen below a predetermined level.

10. The method of claim 7 wherein the step of purging said coal tube comprises the step of injecting a fluid into said coal tube at a point between said source and said tuyere.

11. The method of claim 10 wherein the step of stopping the flow of coal through said coal tube comprises the step of closing a first valve between said coal source and said point.

12. The method of claim 11 including the additional steps of closing a second valve between said point and said tuyere and opening said first valve.

13. A method of clearing an accumulation of coal in a coal tube comprising the steps of:
   monitoring the temperature of a coal tube;
   stopping the flow of coal though said coal tube when said temperature falls below a predetermined level;
   purging said coal tube with a fluid under pressure; and
   restarting the flow of coal through said coal tube.

14. The method of claim 13 wherein the step of monitoring the temperature of a coal tube comprises the step of monitoring the temperature of an exterior portion of a coal tube.

15. The method of claim 13 wherein the step of purging said coal tube comprises the step of injecting a fluid into said coal tube at a point between said source and said tuyere.

16. The method of claim 15 wherein the step of stopping the flow of coal through said coal tube comprises the step of closing a first valve between said coal source and said point.

17. The method of claim 16 including the additional steps of closing a second valve between said point and said tuyere and opening said first valve.

18. In a system comprising a blast furnace having at least one tuyere, a blowpipe for delivering a heated fluid to said tuyere, a source of coal and a coal tube connected between said source of coal and said blowpipe, the improvement comprising:
- a source of pressurized fluid connected to said coal tube at a first location;
- a first valve between said source of pressurized fluid and said coal tube for controlling the flow of fluid from the source of pressurized fluid;
- a second valve in said coal tube between said first location and said source of coal;
- a third valve in said coal tube between said first location and said tuyere;
- a controller for controlling said first, second and third valves; and
- a temperature measuring device operatively connected to said controller for measuring the temperature of said coal tube.

19. The system of claim 18 wherein said temperature measuring device is connected to the outside of said coal tube.

20. The system of claim 18 wherein said temperature measuring device comprises a thermocouple.

21. The system of claim 18 wherein said controller closes said second valve and opens said first valve for a period of time when the temperature of said coal tube falls below a predetermined value and then closes said first valve and opens said second valve after said period of time.

22. The system of claim 18 wherein said controller closes said second valve and opens said first valve for a first period of time when the temperature of said coal tube falls below a predetermined value, then closes said third valve and opens said second valve for a second period of time, then closes said first valve and opens said third valve.

23. The system of claim 18 wherein said coal tube comprises a coal pipe connected to said source of coal and a coal lance connected between said coal pipe and said blowpipe.

24. The system of claim 23 wherein said temperature measuring device is operatively connected to said coal pipe.

25. The system of claim 24 wherein said temperature measuring device comprises a thermocouple.

26. A purging system for clearing an accumulation of coal from a coal lance fed by a coal pipe comprising:
- a temperature sensor connected to the coal pipe for producing signals representative of a sensed temperature;
- a source of fluid selectively connectable to said coal lance through a valve; and
- a controller operatively connected to said sensor for controlling said valve in response to the signals from said sensor;
- whereby said controller automatically opens said valve for a period of time when the temperature of said coal pipe falls below a given level.

27. The system of claim 26 wherein said temperature sensor is connected to an exterior portion of said coal pipe.

28. The system of claim 26 wherein said temperature sensor comprises a thermocouple.

29. A method of regulating the flow of coal in a system for delivering coal from a source of coal to a coal lance comprising the steps of:
- connecting the source of coal to the coal lance with a coal pipe;
- providing a source of fluid under pressure;
- connecting the source of fluid to said coal pipe at a first location;
- providing a first valve between the source of fluid and the first location;
- providing a second valve between said source of coal and the first location;
- providing a third valve between said first location and said coal lance;
- closing said first valve and opening said second and third valves;
- measuring the temperature of said coal pipe; and
- if the temperature of said coal pipe falls below a given value, closing said second valve and opening said first valve for a first period of time.

30. The method of claim 29 including the additional step of closing said third valve and opening said second valve for a second period of time.

31. The method of claim 29 including the additional step of closing said first valve and opening said second valve.

32. The method of claim 30 including the additional step of closing said first valve and openings said third valve.

* * * * *